Patented Oct. 11, 1938

2,132,458

UNITED STATES PATENT OFFICE

2,132,458

PURIFICATION AND GRANULATION OF PENTAERYTHRITOL TETRANITRATE

William Arthur Percival Challenor, Ardrossan, Scotland, assignor to Imperial Chemical Industries Limited, a corporation of Great Britain No Drawing. Application August 10, 1936, Serial No. 95,279. In Great Britain August 20, 1935

13 Claims. (Cl. 260—467)

The present invention relates to a process for preparing pentaerythritol tetranitrate in granular form. In the purification of pentaerythritol tetranitrate, as is well known, the removal of acid is not completely effected by washing the product obtained from the pentaerythritol and the nitrating acid; the pentaerythritol tetranitrate is usually recovered in crystalline form by dissolving it in acetone and precipitating the solution with water to which sufficient sodium carbonate solution has been added to neutralize the remaining acid.

It has further been proposed in producing granular explosives which decompose when melted, such as pentaerythritol tetranitrate, to dissolve the substance in a solvent, the solution then being added to a liquid in motion which mixes in all proportions with the solvent, but which does not dissolve the explosive substance. The known methods of producing pentaerythritol tetranitrate in a loose form suitable for detonator or fuse manufacture do not provide a material having a higher bulk density than 0.2 to 0.4 gm. per cc.

The present invention provides a method whereby pentaerythritol tetranitrate may be prepared in the form of granules having a considerably higher bulk density and/or in a more freely running form than that which is obtained by the prior art methods. The free running properties and the high bulk density of the product prepared according to my invention both render it particularly suitable for use in detonators and in the manufacture of detonating fuse.

The process of the invention may be applied to any form of pentaerythritol tetranitrate, e. g. to purified pentaerythritol tetranitrate or to the crude water-washed material from the nitration process. In the latter case, the removal of residual acid may be effected concurrently with the granulation by introducing into the process a quantity of sodium carbonate or equivalent water-soluble mild alkali sufficient to neutralize the acid content of the crude pentaerythritol tetranitrate.

According to the invention pentaerythritol tetranitrate is precipitated in granular form from a saturated or concentrated solution thereof in acetone or media rich in acetone by dilution of the said solution at or near its boiling point with water, preferably with agitation, the final concentration of acetone in the solution being not less than 25% and preferably between 33% and 50% of the total solution. The dilution is conveniently effected by the injection of steam and is preferably carried out slowly and progressively.

In one form of the invention a concentrated or saturated solution of pentaerythritol tetranitrate in acetone is added slowly to a bath of aqueous acetone in which precipitation of the pentaerythritol tetranitrate occurs, and the rates of addition of water and solution and the rate of vaporization of acetone from the bath are so controlled as to maintain the precipitating bath at the desired acetone concentration. The acetone which is distilled off from the bath is conveniently used to dissolve further quantities of pentaerythritol tetranitrate and the resulting solution is returned to the precipitating bath.

I have found that the most uniform degree of granulation of the product is obtained when the process is carried out in such a manner that the proportion of acetone in the precipitating bath does not fall appreciably below that of the water present, and I prefer accordingly to carry out the granulation so that at least the greater proportion of the product is granulated under such conditions. The degree of fineness of the granulated material is dependent on the rate of admixture, temperatures, quantities and solvent powers for pentaerythritol tetranitrate of the solvent liquor and precipitating bath; the production of coarse granules being in general favoured by a relatively small difference between the solvent power of the two solutions, or by a slow rate of admixture, or by an increase in the temperature of the precipitating solution. When a highly aqueous precipitating bath having little solvent power for pentaerythritol tetranitrate is used, the solvent liquor may itself contain an appreciable proportion of water, for example up to 10%, so that the difference between the solvent power of the two solutions is not so great that the pentaerythritol tetranitrate dissolved in the original solution is rapidly precipitated in the form of a fine flour during the admixture of the solution with the precipitating bath.

In a preferred form of my invention applicable to water-washed crude pentaerythritol tetranitrate, the crude material is treated in an extraction apparatus with acetone. In order to facilitate this extraction, the water-wet material is previously stirred with acetone in order to remove the bulk of the adherent water, and the aqueous acetone is drained off and utilized as the aqueous acetone precipitating solution in the granulation process.

The process is carried out in an ordinary extraction apparatus comprising a solvent boiler, a total reflux condenser and a jacketed vessel in which the charge of acetone-washed crude pentaerythritol tetranitrate is extracted. The ordinary constructional materials will serve for apparatus intended to handle purified pentaerythritol tetranitrate only, but if acid material is to be handled the apparatus should be resistant to dilute nitric acid, and may be constructed in stainless chrome iron alloy or other suitable material.

In carrying out the process according to this preferred form of the invention, the aqueous acetone washings from the initial treatment of the water-wet pentaerythritol tetranitrate are run into the solvent boiler, and an adequate quantity of solid or dissolved water-soluble mild alkali is introduced into the boiler, or partly into the boiler and partly into the extractor. The solvent boiler may be heated by a steam jacket or closed steam coil so that the acetone distils off, condenses and extracts the pentaerythritol tetranitrate in the extractor, from which a practically saturated solution runs back into the aqueous acetone in the boiler. As the solvent power of the aqueous acetone solution in the boiler for pentaerythritol tetranitrate is less than that of the highly concentrated acetone distilled from it, the highly concentrated solution coming from the extractor rapidly saturates the precipitating bath with dissolved pentaerythritol tetranitrate; and thereafter the further quantities of dissolved pentaerythritol tetranitrate coming from the extractor are thrown out of solution in the desired granular form as the acetone in the incoming pentaerythritol tetranitrate solution is redistilled and returned to the extraction process. The granulation may be assisted by the use of means provided for continuously agitating the contents of the solvent boiler.

In a further improvement of this form of the process, the quantity of pentaerythritol tetranitrate remaining dissolved in the relatively concentrated precipitating solution is also recovered in granular form during the process by the gradual addition of water, preferably by the introduction of a proportion of live steam into the boiler. In this manner practically the whole of the pentaerythritol tetranitrate may be recovered in the desired form while using a proportion of acetone to pentaerythritol tetranitrate in the process much lower than that hitherto recorded. Furthermore, as the aqueous acetone mixture in the boiler becomes progressively more dilute, the acetone distilled off and condensed for extraction also contains a gradually increasing proportion of water, so that the solvent power of the extracting liquor also falls as the solvent power of the precipitating liquor is reduced. In this way the tendency to produce a fine floury material is to some extent prevented. I prefer, however, to operate the process so that the acetone concentration in the boiler does not fall below 25% by weight of the acetone-water mixture, and is preferably not less than 33% of the mixture at the conclusion of the extraction. It will be understood that at the commencement of the process, the concentration of water in the acetone should be small; and if necessary dry acetone should be added to the aqueous acetone washings from the crude pentaerythritol tetranitrate in the boiler to ensure that the initial acetone concentration is high enough to enable the extraction to be completed before the progressive dilution of the precipitating bath has reduced it to the lower limit stated.

When the extraction is deemed complete, the passage of steam is discontinued, the contents of the boiler are cooled and the purified and granulated pentaerythritol tetranitrate is then filtered off, and may be washed if necessary with a small quantity of acetone in order to remove any surface contamination by gummy nitration by-product.

The purification and granulation of pentaerythritol tetranitrate may be accomplished according to the above method with rather less than one part of acetone to each part of pentaerythritol tetranitrate in process, and this represents a considerable saving in comparison with the proportions hitherto disclosed.

The amount of pentaerythritol tetranitrate that may be extracted by a given amount of acetone before the solution in the boiler becomes too aqueous will depend on constructional details and operating methods of the various forms of apparatus suitable for use according to the process; but I have had no difficulty in extracting at least one part by weight of pentaerythritol tetranitrate per part of circulated acetone, and maintaining the final concentration of the precipitating solution at at least 33% acetone by weight, under which conditions I obtained a product of satisfactorily high bulk density containing only a comparatively unimportant fraction of undesired fine material. As this fine material is only precipitated during the latter stages of the extraction, when the precipitating liquor is becoming more aqueous, its formation may be avoided by so conducting the process that the acetone concentration in the boiler does not fall below 50%, although naturally, the output will then be smaller.

The invention is further illustrated by the following examples in which the parts are parts by weight:—

*Example I*

2.2 parts crude pentaerythritol tetranitrate, containing about 10% of its weight of water, are stirred with one part of 95% acetone. The mixture is poured into a filter bag suspended in an extraction vessel and the aqueous acetone is allowed to drain into the boiling vessel, to which is added a further quantity of acetone including the final acetone washings from a previously purified batch, in all a further quantity of 0.8 part acetone. About 0.04 part of the gummy nitration by-product obtained by dilution of the pentaerythritol nitrating refuse acid may be added, if not already contained in the acetone washings from the previously purified batch. An amount of anhydrous sodium carbonate sufficient to neutralize the residual acid in the pentaerythritol tetranitrate and render the final solution slightly alkaline, is introduced into the boiler, or partly in the boiler and partly in the extractor. The apparatus is then connected up, hot water is run through the jacket of the boiling vessel, and the passage of live steam into the boiler is commenced. In order to prevent clogging of the extractor, the condenser may be so run that the first extraction until all the residual moisture is removed from the pentaerythritol tetranitrate, is carried out with cold acetone; thereafter the extractor may be heated to accelerate the rate of extraction.

When the acetone solution in the boiler has fallen to the desired concentration, the contents of the boiling vessel are cooled and the granular pentaerythritol tetranitrate is filtered off and washed with a small quantity of fresh acetone, which may subsequently be used as part of the charge for the next batch of crude pentaerythritol tetranitrate for granulation. The aqueous acetone separated from the granulated pentaerythritol tetranitrate is recovered by distillation and any nitration product so isolated is recovered and re-worked.

The washed and dried pentaerythritol tetranitrate is screened through a 20 mesh sieve to remove any unsuitably large particles. The bulk density of the material is not less than 0.65 gram per cc. and may be as high as 0.9 gram per cc., and the material has excellent running properties.

*Example II*

35 lb. of water-wet crude pentaerythritol tetranitrate containing 5 lb. water are mixed with 15 lb. 95% acetone. The mixture is transferred to a jacketed extraction vessel and the aqueous acetone together with a further 10 lb. of 95% acetone, is drained to the jacketed boiler through the hot water jacketed drain passage. A quantity of soda ash adequate to neutralize all the acid remaining in the crude pentaerythritol tetranitrate is introduced into the extraction vessel and the boiler. Hot water is turned on to the jacket of the boiler and the contents are stirred. Acetone boiling off is condensed in the condenser which is initially run so that the extractor is filled with cold acetone. The acetone solution of pentaerythritol tetranitrate drains through the hot water jacketed pipe back to the boiler in which it is agitated with the precipitating solution, the dissolved pentaerythritol tetranitrate being gradually precipitated in granular form as the precipitating solution becomes supersaturated. When the bulk of the residual moisture has been removed from the pentaerythritol tetranitrate, live steam is passed into the boiler and hot water is turned on through the jacket of the extractor so that the rate of circulation and extraction may then be considerably increased. After two hours, 25–30 lb. of pentaerythritol tetranitrate are extracted and the contents of the boiling vessel contain acetone and water in the ratio of 1:2. The live steam is shut off and the contents of the vessel cooled and filtered. The saturated granulated pentaerythritol tetranitrate is washed with a little fresh acetone, to remove surface contamination, and retained for use in the next batch.

The washed and dried pentaerythritol tetranitrate is screened through a 20 mesh sieve to remove any unsuitably large particles. The bulk density of the material is not less than 0.65 gm. per cc. and may be as high as 0.9 gm. per cc., and the material has excellent running properties.

I claim:

1. A process for the production of pentaerythritol tetranitrate in granular form, which process comprises diluting with water a concentrated solution of pentaerythritol tetranitrate in acetone, said dilution being effected near the boiling point of said solution, the final concentration of acetone in said solution being not less than 25%.

2. A process for the production of pentaerythritol tetranitrate in granular form, which process comprises diluting with water a concentrated solution of pentaerythritol tetranitrate in acetone, said dilution being effected gradually and near the boiling point of said solution, the final concentration of acetone being not less than 25%.

3. A process for the production of pentaerythritol tetranitrate in granular form, which process comprises diluting with water a concentrated solution of pentaerythritol tetranitrate in acetone, said dilution being effected near the boiling point of said solution and being accomplished at least in part by the injection of steam into said solution, the final concentration of acetone in said solution being not less than 25%.

4. A process for the production of pentaerythritol tetranitrate in granular form, which process comprises diluting with water a saturated solution of pentaerythritol tetranitrate in acetone, said dilution being effected near the boiling point of said solution, the final concentration of acetone in said solution being not less than 25%.

5. A process for the production of pentaerythritol tetranitrate in granular form, which process comprises diluting with water a concentrated solution of pentaerythritol tetranitrate in acetone, said dilution being effected at the boiling point of said solution, the final concentration of acetone in said solution being not less than 25%.

6. A process for the production of pentaerythritol tetranitrate in granular form, which process comprises diluting with water a concentrated solution of pentaerythritol tetranitrate in acetone, said dilution being effected near the boiling point of said solution, the final concentration of acetone in said solution being between 33% and 50%.

7. A process for the production of pentaerythritol tetranitrate in granular form, which process comprises diluting a concentrated solution of pentaerythritol tetranitrate with aqueous acetone, said dilution being effected near the boiling point of said solution, the final concentration of acetone in said solution being not less than 25%.

8. A process for the production of pentaerythritol tetranitrate in granular form, which process comprises diluting a concentrated solution of pentaerythritol tetranitrate with aqueous acetone, the final concentration of acetone in said solution being not less than 25%, distilling off acetone above said limiting value, dissolving further quantities of pentaerythritol tetranitrate by means of said volatilized acetone to replenish said concentrated solution of pentaerythritol tetranitrate in acetone.

9. A process for the production of pentaerythritol tetranitrate in granular form, which process comprises adding the concentrated solution of pentaerythritol tetranitrate in acetone to a bath of aqueous acetone at a temperature near the boiling point of said solution, maintaining an acetone concentration of at least 25% in said bath, volatilizing a portion of the acetone present above said minimum concentration to cause precipitation of said pentaerythritol tetranitrate, recovering said volatilized acetone and dissolving solid pentaerythritol tetranitrate therewith to replenish said concentrated solution of pentaerythritol tetranitrate in acetone.

10. A continuous process for the production of pentaerythritol tetranitrate in granular form, which process comprises continuously adding a concentrated solution of pentaerythritol tetranitrate in acetone to a bath of aqueous acetone at a temperature near the boiling point of said solution, maintaining an acetone concentration of at least 25% in said bath, continuously volatilizing a portion of the acetone present above said minimum concentration to cause precipitation of said pentaerythritol tetranitrate, continuously recovering said volatilized acetone and dissolving solid pentaerythritol tetranitrate therewith to replenish said concentrated solution of pentaerythritol tetranitrate in acetone.

11. A process for the production of pentaerythritol tetranitrate in granular form, which process comprises adding a concentrated solution of pentaerythritol tetranitrate in acetone to a bath of aqueous acetone at a temperature near the boiling point of said solution, maintaining an acetone concentration of at least 25% in said bath, volatilizing a portion of the acetone present above said minimum concentration to cause the precipitation of said pentaerythritol tetranitrate, said volatilization being accomplished at least in part by the injection of steam into said bath, recovering said volatilized acetone and dissolving said pentaerythritol tetranitrate therewith to replenish said concentrated solution of pentaerythritol in acetone.

12. Granular pentaerythritol tetranitrate having a bulk density greater than 0.4 gram per cubic centimeter.

13. Pentaerythritol tetranitrate in a free-running form and having a relatively high bulk density as a result of precipitating the same from a concentrated solution of pentaerythritol tetranitrate by diluting the said solution near its boiling point with aqueous acetone to a final acetone concentration not less than 25%.

WILLIAM A. P. CHALLENOR.

CERTIFICATE OF CORRECTION.

Patent No. 2,132,458.  October 11, 1938.

WILLIAM ARTHUR PERCIVAL CHALLENOR.

It is hereby certified that error appears in the printed specification of the above numbered patent requiring correction as follows: Page 3, first column, line 62, claim 1, strike out the syllable, words and syllable "thritol tetranitrate in granular form, which proc-"; and that the said Letters Patent should be read with this correction therein that the same may conform to the record of the case in the Patent Office.

Signed and sealed this 15th day of November, A. D. 1938.

Henry Van Arsdale (Seal)  Acting Commissioner of Patents.